(No Model.)

J. W. GILMORE & C. F. GRIFFIN.
INTERMITTENT HORSE POWER.

No. 547,206. Patented Oct. 1, 1895.

Witnesses
CC Burdine
H. A. Dodge.

Inventors:
John W. Gilmore
Charles F. Griffin
by John G. Manahan
their Attorney

UNITED STATES PATENT OFFICE.

JOHN W. GILMORE AND CHARLES F. GRIFFIN, OF COMPTON, ILLINOIS.

INTERMITTENT HORSE-POWER.

SPECIFICATION forming part of Letters Patent No. 547,206, dated October 1, 1895.

Application filed March 23, 1895. Serial No. 542,974. (No model.)

*To all whom it may concern:*

Be it known that we, JOHN W. GILMORE and CHARLES F. GRIFFIN, citizens of the United States, residing at Compton, in the county of Lee and State of Illinois, have invented certain new and useful Improvements in Intermittent Horse-Powers; and we do declare the following to be a full, clear, and exact description of the invention, such as will enable others skilled in the art to which it appertains to make and use the same, reference being had to the accompanying drawings, and to the letters of reference marked thereon, which form a part of this specification.

Our invention has reference to improvements in that class of horse-powers in which the draft of the animal or animals is suspended at recurring intervals to permit the return of certain appliances to their first position.

Our invention consists of a revolving drum adapted to wind and unwind a rope upon its periphery, with adjunctive appliances for rotating said drum in one direction by horse-power, then releasing the same from connection with the team and rotating said drum oppositely by hand or by the gravity of articles raised by its prior forward movement. There is, therefore, necessarily involved devices for optionally connecting the winding-drum with the motive power, and also appliances for following up the forward rotation of said drum and locking it successively against retrograde movement, to provide against any accident happening to the team or their attachment to the rotating lever or against the disposition of the team to stop or back up.

The general purpose of our invention is to raise loaded hay-forks in storing hay in barns and other buildings, and also to raise building material during the erection of high structures. Heretofore in such instances it has been customary to bring the horse back to the starting-point at each operation by either leading him around or backing him up, which involved not only time and labor, but also required great space to permit the animal to move out horizontally a distance equal to that of the altitude to be reached. In our construction we avoid these objections by the construction illustrated in the accompanying drawings, in which—

Figure 1:
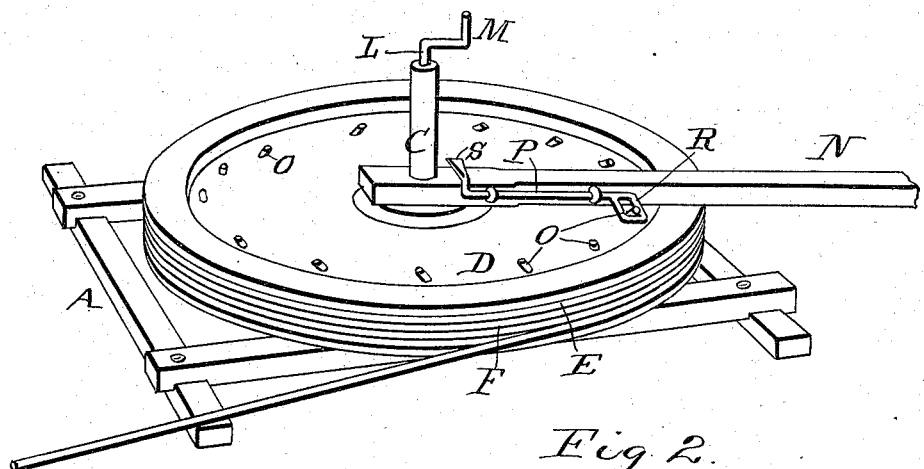
Figure 2:
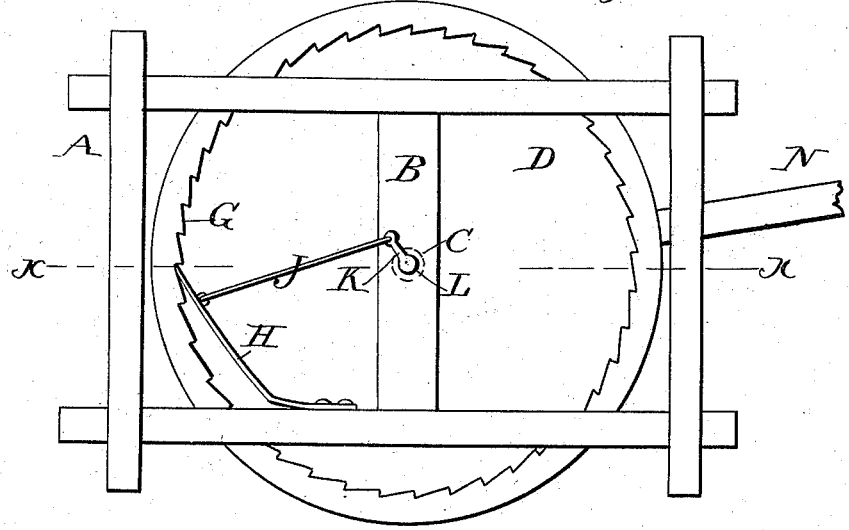
Figure 3:
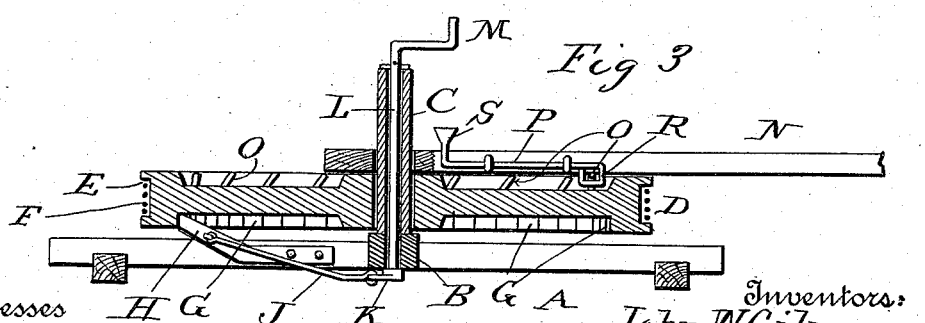

Figure 1 is a perspective from the upper side of the machine embodying our invention. Fig. 2 is a view of the under side of the same. Fig. 3 is a vertical cross-section in line $xx$ of Fig. 1.

Similar letters refer to similar parts in each view.

Referring to Fig. 2, A is a suitable frame adapted to rest upon the ground and provided with a central cross-beam B. A hollow post C is seated vertically in the center of beam B and serves as the pivot for the rotation of the drum D. The latter is provided on its periphery with the annular groove E, adapted to carry the coils of the rope F. Around the base of the drum D, a short distance within its margin, are formed an annular series of notches or ratchets G. A spring-pawl H is suitably attached at its one end to the frame A, and projected diagonally therefrom in such position that its opposite end successively engages the ratchets G on drum D in the forward rotation of the latter. A horizontal rod J is attached at one end to the pawl H, near the latter's free end, and pivoted at its inner end on a crank-wrist K, formed on the lower end of the vertical shaft L, which extends upwardly through post C, and is provided at its upper end with a crank M within convenient reach of the driver's seat (not shown) seated on or near post C.

N is the team-lever, the inner end of which is pivoted loosely on post C, and which, extending radially therefrom beyond the periphery of the drum D, is adapted at its outer end for the attachment of the team. At suitable intervals around the upper surface of the drum D, near its margin, are seated the series of studs O. A rock-shaft P is pivotally supported along the rear side of the lever N, parallel with the latter and provided at its outer end with a lateral loop R, adapted to automatically engage each of the studs O when permitted to rest on the upper surface of the drum D. This engagement attaches the lever N and thereby the team to the drum D; but when it is desired to unwind the rope F a foot-lever S, formed on the inner end of the rock-shaft P within convenient reach of the driver, who preferably stands upon the top of the drum or on the team-lever, enables him to rock the loop R out of engagement with stud O and to hold said loop above such possible engagement until the drum has been rotated reversely as far as desired, when by the withdrawal of the driver's foot from the lever S the loop R drops down again and is dragged by lever N along until it reaches the first stud O in its path, which it engages and thereby again connects lever N and drum D. The studs O project slightly backward, but the arc movement of loop R in the same direction disengages the latter. The function of the spring-pawl H is by successive engagements with the ratchets G to prevent any casual retrogression of said drum. The pawl H is withdrawn from the ratchets G and held out of such engagement during the aforesaid reverse rotation of the drum D by means of the crank M, through which the driver imparts a partial axial rotation to the vertical shaft L, and through the medium of rod J withdraws pawl H, as aforesaid.

The purposes of our invention have been heretofore mentioned. Its advantages are its simplicity, cheapness, durability, and perfect adaptation to every instance in which horse-power is required intermittently.

What we claim as our invention, and desire to secure by Letters Patent of the United States, is—

1. In a horse power, the combination, with a frame, of a hollow post projecting upwardly therefrom, a drum journaled upon the post, the under surface of which is provided with ratchet teeth, a team lever pivotally secured above the drum, a shaft through the post, each end of which is provided with a crank arm, the upper arm of which is adapted to be grasped by the operator, a spring secured at one end to the frame and having its opposite end in engagement with the teeth of the drum, a rod between the crank arm at the lower end of the shaft and the free end of the spring, and means for intermittingly engaging and disengaging the lever from the drum, substantially as set forth.

2. In a horse power, the combination, with a frame, of a hollow post projecting upward therefrom, a drum loosely journaled upon the post, the under surface of which is provided with ratchet teeth and the upper surface is provided with a series of studs, a team lever loosely journaled upon the post above the drum, a rock shaft pivotally supported along the rear side of the lever, the outer end of which is provided with a laterally projecting lug adapted to automatically engage with the studs, a foot pedal at the inner end of the shaft, a pawl for engaging with the teeth upon the under side of the drum, and a crank shaft through the post for operating the pawl, the upper end of the shaft through the post and the pedal upon the rock shaft on the team lever being in such position relatively to each other that the driver may operate either one or both of them at the same time, substantially as set forth.

In testimony whereof we affix our signatures in presence of two witnesses.

JOHN W. GILMORE.
CHARLES F. GRIFFIN.

Witnesses:
W. W. GILMORE,
M. M. AVERY.